United States Patent [19]

Okada et al.

[11] Patent Number: 5,399,929
[45] Date of Patent: Mar. 21, 1995

[54] MINIATURE MOTOR

[75] Inventors: Kazuo Okada; Keisuke Ebihara, both of Chiba, Japan

[73] Assignee: Mabuchi Motor Co., Ltd., Matsudo, Japan

[21] Appl. No.: 169,976

[22] Filed: Dec. 17, 1993

[30] Foreign Application Priority Data

Dec. 24, 1992 [JP] Japan .................. 4-088347 U

[51] Int. Cl.⁶ ............................. H02K 1/18
[52] U.S. Cl. ................ 310/154; 310/40 MM; 310/89; 310/91
[58] Field of Search ........... 310/154, 42, 91, 40 MM, 310/88, 155, 89

[56] References Cited

U.S. PATENT DOCUMENTS

| | | | |
|---|---|---|---|
| 1,039,543 | 9/1912 | Kennington | 310/154 U X |
| 4,682,066 | 7/1987 | Abbratozzato et al. | 310/154 |
| 4,827,173 | 5/1989 | Corbach et al. | |
| 5,216,306 | 6/1993 | Nakazawa et al. | 310/89 |
| 5,276,375 | 1/1994 | Hartel | 310/154 |

OTHER PUBLICATIONS

British Search Report dated 3 Mar. 1994.

*Primary Examiner*—R. Skudy
*Attorney, Agent, or Firm*—McGlew and Tuttle

[57] ABSTRACT

A miniature motor comprising a case formed into a bottomed hollow tubular shape and having permanent magnets fixedly fitted to the inner circumferential surface thereof, a rotor consisting of an armature and a commutator, and a case cover engaged with an open end of the case and having brushes making sliding contact with the commutator, and input terminals electrically connected to the brushes, in which fixing ribs are provided on the inner circumferential surface of the case, extending along the axial direction of the case; the edges of the permanent magnets formed into an arc-segment cross-sectional shape being caused to make contact with the side edges of the fixing ribs to fixedly fit the permanent magnets to the inner circumferential surface of the case; projections formed integrally with the permanent magnets along the edges of the permanent magnets are provided facing the surface of the fixing ribs.

3 Claims, 3 Drawing Sheets

MINIATURE MOTOR

BACKGROUND OF THE INVENTION AND RELATED ART STATEMENT

This invention relates generally to a miniature motor used in audio and video equipment, and automotive electrical components, and more particularly to a miniature motor which can be assembled easily, has high resistance to vibration, impact, etc. and high reliability, and is free from troubles caused by the entry of foreign matter.

FIG. 1 is a partially cross-sectional side view illustrating an example of miniature motor to which this invention is applied. In FIG. 1, reference numeral 31 refers to a case made of a metallic material, such as mild steel, formed into a bottomed hollow tubular shape, and having arc-segment-shaped permanent magnets 32 fixedly fitted to the inner circumferential surface thereof. Numeral 33 refers to a case cover made of a thermoplastic resin material, for example, and formed in such a fashion that the case cover 33 engages with an open end of the case 31. Numeral 34 refers to a rotor consisting of an armature 35 facing the permanent magnets 32 and a commutator, and rotatably supported by bearings 37 and 38 each provided on the case 31 and the case cover 33.

Numeral 39 refers to brush arms made of an electrically conductive material, formed into a strip shape, having at free ends thereof brushes 40 making sliding contact with the commutator 36, and provided inside the case cover 33. Inside the case cover 33 provided are input terminals 41 electrically connected to the brush arms 39 so that power can be supplied from an external d-c power source to the armature 35 via the brush arms 39, the brushes 40 and the commutator 36.

With the aforementioned construction, as current is fed to the armature 35, rotating force is imparted to the armature 35 disposed in a magnetic field formed by the permanent magnets 32 fixedly fitted to the inner circumferential surface of the case 31, causing the rotor 34 to rotate, driving various pieces of equipment connected to the rotor 34.

In a miniature motor having the aforementioned construction, permanent magnets 32 are fixedly fitted inside the case 31 by various means, such as the use of pins, or adhesive. These conventional fixing means inevitably involve increases in the number of components and the time and manhours required for fixedly fitting the permanent magnets 32. This could lead to increased manufacturing cost.

As a means for fixedly fitting the permanent magnets 32 while solving the above-mentioned problems, the use of fixing ribs is known. FIG. 2 is an end view illustrating the essential part of an example of means for fixedly fitting the permanent magnets 32 with fixing ribs. Like parts are indicated by like numerals shown in FIG. 1. In FIG. 2, numeral 42 refers to a fixing rib; four fixing ribs 42, for example, being provided on the inner circumferential surface of the case 31 along the axial direction of the case 31. These fixing ribs 42 can be formed by causing a punch to advance in the axial direction of the case 31, or subjecting the case 31 to partial plastic deformation in the thickness direction. By means of the fixing ribs 42 thus formed and the circular arc surface of the case 31, the permanent magnets 32 can be fixedly fitted to the inner circumferential surface of the case 31.

The miniature motor of the aforementioned construction has an advantage in that the permanent magnet 32 can be fixedly fitted to the inner circumferential surface of the case 31 relatively easily and with less components, but has the following problems.

FIG. 3 is a perspective view illustrating the state where the permanent magnet 32 is fixedly fitted to the case 31. Like parts are indicated by like numerals used in FIG. 2. In the figure, when the arc-segment-shaped permanent magnet 32 is caused to match with and pressfitted to the circular arc surface of the case 31 between a pair of the fixing ribs 42 and 42 in the axial direction (in the direction shown by arrow A) of the case 31. When press-fitting the permanent magnet 32 onto the circular arc surface of the case 31, chips, flakes, etc. are produced from the sliding parts of the permanent magnet 32 and/or the fixing ribs 42 as the edges of the permanent magnet 32 and the fixing ribs 42 rub against each other.

Upon completion of assembly work, therefore, cleaning is needed to remove chips, etc., but these chips, etc. tend to adhere to the surface of the fixing ribs 42, making it difficult to completely remove them. As a result, such foreign matter tends to scatter inside the motor, entering into the gap between the rotor 34 and the permanent magnets 32, as shown in FIG. 1, presenting the risk of a rotor lock and other troubles.

If a gap is provided between the permanent magnet 32 and the fixing rib 42 to reduce the generation of the aforementioned chips, the state of engagement between them tends to become unstable, causing relative movement between the permanent magnet 32 and the fixing rib 42. This could result in lowered characteristics of the miniature motor.

SUMMARY OF THE INVENTION

This invention is intended to overcome the problems inherent in the prior art. It is an object of this invention to provide a miniature motor which prevents chips and other foreign matter from scattering inside the motor, and has high reliability.

DETAILED DESCRIPTION OF THE EMBODIMENTS

Figure 1:
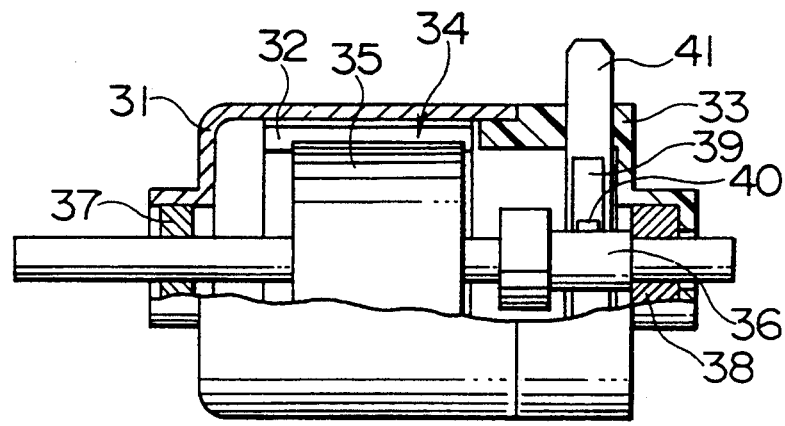
FIG. 1 is a partially cross-sectional side view illustrating an example of prior art miniature motor to which this invention is applied.
Figure 2:
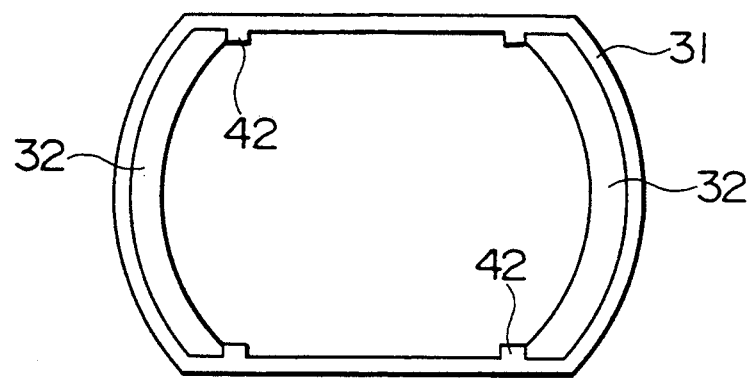
FIG. 2 is an end view of a prior art miniature motor case illustrating the essential part of an example of means for fixedly fitting permanent magnets by means of fixing ribs.
Figure 3:
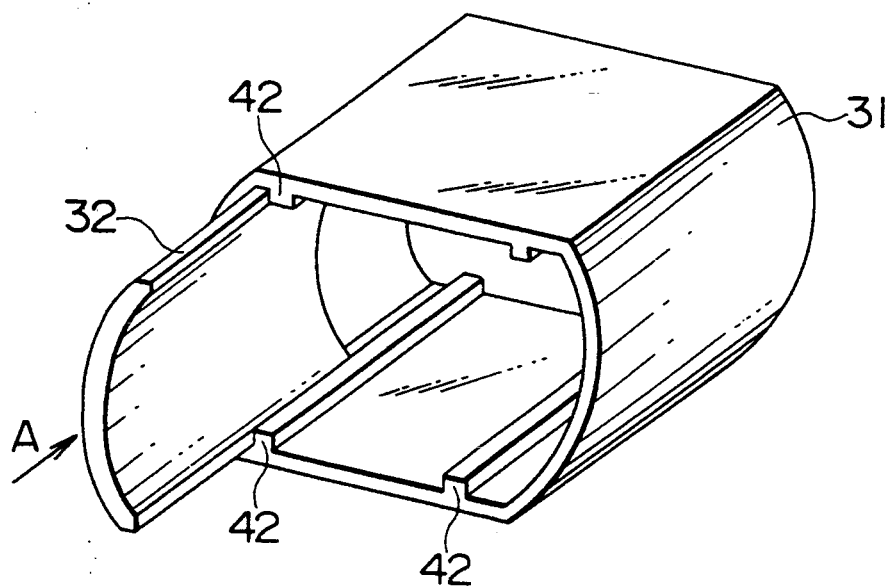
FIG. 3 is a perspective view of a prior art miniature motor case illustrating the state where a permanent magnet is fixedly fitted to the case.
Figure 4:
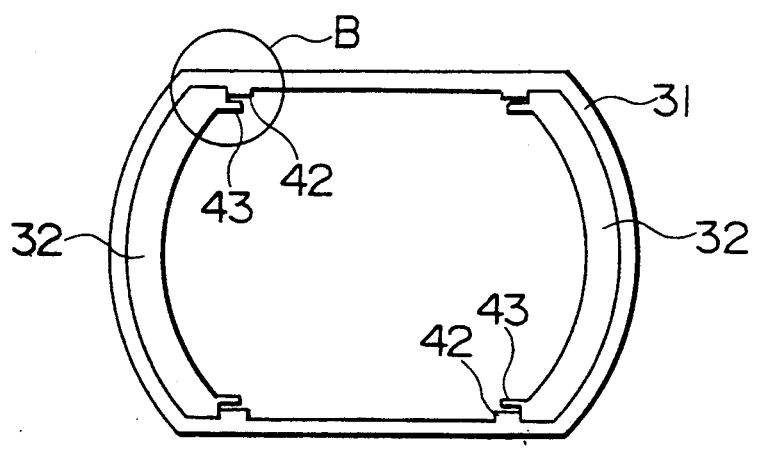
FIG. 4 is an end view illustrating an embodiment of this invention.
Figure 5:
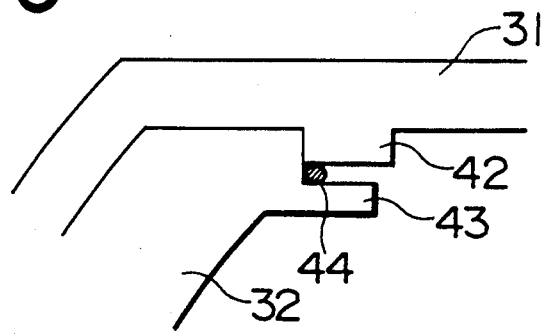
FIG. 5 is an enlarged view of part B shown in FIG. 4.

FIG. 4 is an end view of the essential part of an embodiment of this invention. FIG. 5 is an enlarged view of part B shown in FIG. 4. Like parts are indicated by like numerals used in FIGS. 1 through 3. In FIGS. 4 and 5, numeral 43 refers to a projection formed integrally with the permanent magnet 32 along the edge of the permanent magnet 32 in such a manner that the projection 43 faces the surface of the fixing rib 42. The projection 43 can be formed simultaneously at the time of forming the permanent magnet 32.

With the aforementioned construction, a chip 44 produced as the permanent magnet 32 is press-fitted to the case 31 is retained between the fixing rib 42 and the projection 43, as shown in FIG. 5, and thus prevented from being scattered inside the motor. Although a space formed by the fixing rib 42 and the projection 43 is opened to the inside of the motor, the chip 44, which is a magnetic material, is attracted and held in the gap by the magnetic force of the permanent magnet 32, and thus prevented from entering inside the motor.

Figure 6:
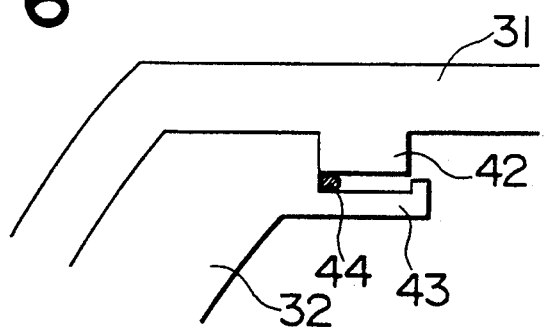
FIG. 6 is a diagram illustrating a modified example of the projection shown in FIG. 5.

FIG. 6 is a diagram illustrating a modified example of the projection 43 shown in FIG. 5. That is, the projection 43 is formed into an essentially L shape in cross section. The chip 44 can better be retained by forming the projection 43 in the aforementioned manner.

Figure 7:
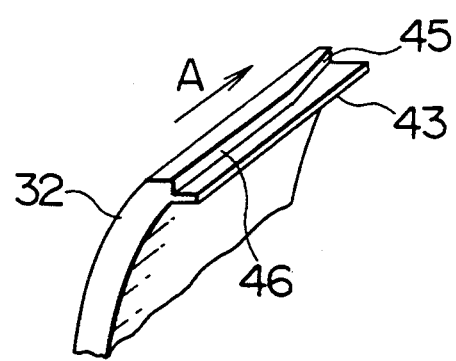
FIG. 7 is a perspective view illustrating the essential part of a permanent magnet in an embodiment of this invention.

FIG. 7 is a perspective view illustrating the essential part of the permanent magnet 32 in an embodiment of this invention. In FIG. 7, numeral 45 refers to a tapered part provided at the tip, in the press-fitting direction (direction A) of the permanent magnet 32, of the edge 46 that makes contact with the fixing rib 42 shown in FIGS. 5 and 6. By forming the tapered part 45 in such a manner, the operation of inserting the permanent magnet 32 into the case 31 as shown in FIG. 3 becomes easy, and the amount of chips generated during press fitting can be reduced.

The tapered part 45 can be formed on both end faces of the permanent magnet 32. In such a case, the permanent magnet 32 can be press-fitted from either end face thereof, thus improving workability.

This invention having the aforementioned construction and operation has an effect of retaining chips and other foreign matter produced when the permanent magnet is press-fitted to the case between the fixing ribs and the projection formed integrally with the permanent magnet, preventing the foreign matter from scattering inside the motor, and improving the reliability of the miniature motor.

What is claimed is:

1. A miniature motor, comprising:
   a case made of metallic material, said case being formed into a bottomed hollow tubular shape, said case having an inner circumferential surface with fixing ribs provided thereon, extending in an axial direction;
   permanent magnets formed in an arc-segment cross sectional shape, said permanent magnets being fixedly fitted to said inner circumferential surface of said case with edges of said permanent magnets being in contact with a side of said fixing ribs, said permanent magnets having projections formed integrally therewith along edges of said permanent magnets, said projections being disposed facing a surface of said fixing ribs;
   a rotor including an armature and a commutator, said rotor being positioned within said case;
   a case cover engaged with an open end of said case;
   brushes making sliding contact with said commutator;
   input terminals electrically connected to said brushes; and
   bearings provided on said bottom of said case and provided on said case cover, said rotor being rotatably supported by said bearings.

2. Miniature motor according to claim 1, wherein said projections are formed with a substantially L-shape in cross section.

3. Miniature motor according to claim 1, wherein said edges of said permanent magnets include at least one tapered part disposed adjacent a region wherein said permanent magnets make contact with said fixing ribs.

* * * * *